(12) United States Patent
Takesada et al.

(10) Patent No.: US 11,685,827 B2
(45) Date of Patent: Jun. 27, 2023

(54) VINYL CHLORIDE RESIN COMPOSITION FOR POWDER MOLDING, VINYL CHLORIDE RESIN MOLDED BODY AND LAMINATE

(71) Applicants: KANEKA CORPORATION, Osaka (JP); TATSUTA CHEMICAL CO., LTD., Tokyo (JP)

(72) Inventors: Kentaro Takesada, Ibaraki (JP); Kohei Hosomi, Hyogo (JP)

(73) Assignees: KANEKA CORPORATION, Osaka (JP); TATSUTA CHEMICAL CO., LTD., Ibaraki (JP)

( * ) Notice: Subject to any disclaimer, the term of this patent is extended or adjusted under 35 U.S.C. 154(b) by 458 days.

(21) Appl. No.: 16/756,449

(22) PCT Filed: Oct. 12, 2018

(86) PCT No.: PCT/JP2018/038088
§ 371 (c)(1),
(2) Date: Apr. 15, 2020

(87) PCT Pub. No.: WO2019/078108
PCT Pub. Date: Apr. 25, 2019

(65) Prior Publication Data
US 2020/0255644 A1   Aug. 13, 2020

(30) Foreign Application Priority Data

Oct. 16, 2017  (JP) .............. JP2017-200591

(51) Int. Cl.
| | |
|---|---|
| C08L 27/06 | (2006.01) |
| B29C 41/00 | (2006.01) |
| B29C 41/18 | (2006.01) |
| B32B 5/18 | (2006.01) |
| B32B 27/30 | (2006.01) |
| B32B 27/40 | (2006.01) |
| C08J 3/12 | (2006.01) |
| C08K 5/00 | (2006.01) |
| C08K 5/105 | (2006.01) |
| C08L 33/08 | (2006.01) |
| C08L 33/12 | (2006.01) |
| C08L 83/10 | (2006.01) |

(52) U.S. Cl.
CPC ............ *C08L 27/06* (2013.01); *B29C 41/003* (2013.01); *B29C 41/18* (2013.01); *B32B 5/18* (2013.01); *B32B 27/304* (2013.01); *B32B 27/40* (2013.01); *C08J 3/12* (2013.01); *C08K 5/0016* (2013.01); *C08K 5/105* (2013.01); *C08L 33/08* (2013.01); *C08L 33/12* (2013.01); *C08L 83/10* (2013.01); *C08L 2205/03* (2013.01); *C08L 2205/18* (2013.01)

(58) Field of Classification Search
None
See application file for complete search history.

(56) References Cited

U.S. PATENT DOCUMENTS

| | | | |
|---|---|---|---|
| 4,956,222 | A | 9/1990 | Matsuura et al. |
| 5,349,017 | A | 9/1994 | Matsumoto et al. |
| 10,106,669 | B2 | 10/2018 | Nishimura |
| 2011/0288218 | A1 | 11/2011 | Nishimura et al. |
| 2016/0177087 | A1* | 6/2016 | Matsuoka .............. C08L 67/04 |
| 2016/0237297 | A1* | 8/2016 | Kuwahara |
| 2016/0333177 | A1 | 11/2016 | Nishii et al. |
| 2016/0347932 | A1 | 12/2016 | Nishimura |
| 2019/0270906 | A1 | 9/2019 | Iwabuchi |
| 2021/0363343 | A1* | 11/2021 | Takesada ................ C08L 67/02 |

FOREIGN PATENT DOCUMENTS

| | | |
|---|---|---|
| CN | 1058790 A | 2/1992 |
| CN | 105086313 A | 11/2015 |
| EP | 0323197 A1 | 7/1989 |
| EP | 0 468 433 A2 | 1/1992 |
| EP | 2392618 A1 | 12/2011 |
| EP | 3031855 A1 | 6/2016 |
| EP | 3121229 A1 | 1/2017 |
| EP | 3438219 A1 | 2/2019 |
| JP | S63-125535 A | 5/1988 |

(Continued)

OTHER PUBLICATIONS

Translation of JPH02646A.Matsuura Isao, etc., Jan. 5, 1990, Expandable Vinyl Chloride Resin Composition for Powder Molding and Its Production (Year: 1990).*

(Continued)

*Primary Examiner* — Ling Siu Choi
*Assistant Examiner* — Huihong Qiao
(74) *Attorney, Agent, or Firm* — Osha Bergman Watanabe & Burton LLP

(57) ABSTRACT

A polyvinyl chloride composition for powder molding includes a polyvinyl chloride (A) an amount of 100 parts by mass, a plasticizer in an amount of 110 parts by mass or more and 150 parts by mass or less, and an acrylic polymer in an amount of 4 parts by mass or more and 23 parts by mass or less. The polyvinyl chloride (A) has an average particle diameter of 50 μm or more and 500 μm or less and an average degree of polymerization of 1,350 or more. The acrylic polymer has an average particle diameter of 0.01 μm or more and 10 μm or less and contains a constitutional unit derived from a (meth) acrylic ester in an amount of 50 mass % or more.

12 Claims, No Drawings

(56) References Cited

FOREIGN PATENT DOCUMENTS

| | | | | |
|---|---|---|---|---|
| JP | H01-215845 A | | 8/1989 | |
| JP | 2015117314 A | * | 1/1990 | ............. B32B 27/22 |
| JP | H02-646 A | | 1/1990 | |
| JP | H02646 A | * | 1/1990 | ............. C08J 9/224 |
| JP | 2001-55477 A | | 2/2001 | |
| JP | 2011-173974 A | | 9/2011 | |
| JP | 2012-7026 A | | 1/2012 | |
| JP | 2015-67728 A | | 4/2015 | |
| JP | 2015-117314 A | | 6/2015 | |
| KR | 20160110839 A | | 9/2016 | |
| WO | 2010/061630 A1 | | 6/2010 | |
| WO | 2010/087093 A1 | | 8/2010 | |
| WO | 2015/020104 A1 | | 2/2015 | |
| WO | 2017/170160 A1 | | 10/2017 | |

OTHER PUBLICATIONS

Translation of JP2015117314.Takesada Kentaro, etc. Jun. 25, 2015, Vinyl Chloride-Based Resin Composition, Vinyl Chloride-Based Resin Powder Slush Molded Body, Resin Laminate and Manufacturing Method Therefor. (Year: 2015).*

Office Action issued in counterpart Chinese Patent Application No. CN 201880067451.3 dated Nov. 9, 2021 (7 pages).

Extended European Search Report issued in corresponding European Patent Application No. 18868668.7 dated Jun. 3, 2021 (6 pages).

International Search Report issued in International Application No. PCT/JP2018/038088, dated Jan. 15, 2019 (2 pages).

Written Opinion issued in International Application No. PCT/JP2018/038088, dated Jan. 15, 2019 (5 pages).

* cited by examiner

VINYL CHLORIDE RESIN COMPOSITION FOR POWDER MOLDING, VINYL CHLORIDE RESIN MOLDED BODY AND LAMINATE

TECHNICAL FIELD

The present invention relates to a polyvinyl chloride composition for powder mold to be favorably used for powder slush molding, a polyvinyl chloride molded body, and a laminate.

BACKGROUND ART

A polyvinyl chloride composition has excellent chemical resistance and durability. In addition, a molded body obtained by molding a polyvinyl chloride composition blended with a plasticizer has excellent flexibility and a favorable texture and imparts a sense of luxuriousness, and is thus often used as a facing material for automobile interior parts such as an instrument panel and a door trim. In particular, a laminate and the like formed of a molded body obtained by molding a polyvinyl chloride composition through powder slush molding and a polyurethane resin or the like is suitably used for automobile interior parts.

However, a molded body obtained by molding a polyvinyl chloride composition blended with a plasticizer has a problem in that the plasticizer moves to the surface of the molded body under the influence of heat, light, or the like, and thus the flexibility of the molded body is likely to decrease. Therefore, the blend amount of the plasticizer is increased in order to improve the flexibility, but an increase in the blend amount of the plasticizer poses a problem in that, when a piece of cloth is used to wipe off dirt on the surface of the molded body, fibers attach to the surface. To address this, Patent Document 1 proposes that adhesion of fuzz to a polyvinyl chloride composition and bleeding of an additive in a polyvinyl chloride composition can be suppressed by further blending hydroxyl group-modified silicone oil into the polyvinyl chloride composition blended with a plasticizer. Patent Document 2 proposes that the surface characteristics and flexibility of a molded body are improved by using a polyvinyl chloride composition containing two types of polyvinyl chloride particles having different average particle diameters, and modified polyorganosiloxane particles.

PRIOR ART DOCUMENTS

Patent Documents

Patent Document 1: JP 2012-7026A
Patent Document 2: JP 2015-117314A

DISCLOSURE OF INVENTION

Problem to be Solved by the Invention

However, for the molded bodies made of the polyvinyl chloride compositions disclosed in Patent Documents 1 and 2, there has been demanded to further improve the surface characteristics while favorably maintaining flexibility after heat aging.

The present invention provides a polyvinyl chloride composition for powder molding from which a molded body having high flexibility after heat aging as well as favorable surface characteristics can be produced, a polyvinyl chloride molded body, and a laminate.

Means for Solving Problem

The present invention relates to a polyvinyl chloride composition for powder molding including: a polyvinyl chloride (A) in an amount of 100 parts by mass; a plasticizer in an amount of 110 parts by mass or more and 150 parts by mass or less; and an acrylic polymer in an amount of 4 parts by mass or more and 23 parts by mass or less, wherein the polyvinyl chloride (A) has an average particle diameter of 50 μm or more and 500 μm or less and an average degree of polymerization of 1,350 or more, the acrylic polymer has an average particle diameter of 0.01 μm or more and 10 μm or less and contains a constitutional unit derived from a (meth)acrylic ester in an amount of 50 mass % or more, and the (meth)acrylic ester includes at least one selected from the group consisting of a (meth)acrylic ester of an aliphatic alcohol having two or more carbon atoms and a (meth)acrylic ester of an aromatic alcohol.

It is preferable that the (meth)acrylic ester of an aliphatic alcohol having two or more carbon atoms includes at least one selected from the group consisting of n-butyl (meth)acrylate, isobutyl (meth)acrylate, and tert-butyl (meth)acrylate. It is preferable that the acrylic polymer contains a constitutional unit derived from methyl (meth)acrylate in an amount of 40 mass % or more and 95 mass % or less, and a constitutional unit derived from at least one (meth)acrylic ester selected from the group consisting of n-butyl (meth)acrylate, isobutyl (meth)acrylate, and tert-butyl (meth)acrylate in an amount of 5 mass % or more and 60 mass % or less. It is preferable that the polyvinyl chloride composition for powder molding further includes a polyvinyl chloride (B) having an average particle diameter of 0.05 μm or more and less than 50 μm, and the blend amount of the polyvinyl chloride (B) is 36 parts by mass or less with respect to 100 parts by mass of the polyvinyl chloride (A), and it is more preferable that the total blend amount of the acrylic polymer and the polyvinyl chloride (B) is 15 parts by mass or more and 40 parts by mass or less with respect to 100 parts by mass of the polyvinyl chloride (A). It is preferable that the polyvinyl chloride composition for powder molding further includes an acrylic modified polyorganosiloxane, and the blend amount of the acrylic modified polyorganosiloxane is 5 parts by mass or less with respect to 100 parts by mass of the polyvinyl chloride (A). It is preferable that the plasticizer includes a trimellitate-based plasticizer.

In the present invention, it is preferable to use the polyvinyl chloride composition for powder molding in powder slush molding.

The present invention also relates to a polyvinyl chloride molded body obtained by molding the polyvinyl chloride composition for powder molding through powder slush molding.

In the present invention, it is preferable to use the polyvinyl chloride molded body as a facing for a vehicle interior material.

The present invention also relates to a laminate obtained by laminating a polyurethane foam layer and the polyvinyl chloride molded body.

In the present invention, it is preferable to use the laminate as a vehicle interior material.

Effects of the Invention

With the present invention, it is possible to provide a polyvinyl chloride composition for powder molding from which a molded body having high flexibility after heat aging as well as favorable surface characteristics can be produced. Also, with the present invention, it is possible to provide a polyvinyl chloride molded body having high flexibility after heat aging as well as favorable surface characteristics, and a laminate using the same.

DESCRIPTION OF THE INVENTION

The inventors of the present invention conducted numerous studies to solve the above-mentioned problems. As a result, they found that, when a polyvinyl chloride (A) having an average degree of polymerization of 1,350 or more and an average particle diameter of 50 μm or more and 500 μm or less was used together with an acrylic polymer having an average particle diameter of 0.01 μm or more and 10 μm or less and containing a constitutional unit derived from (meth) acrylic ester in an amount of 50 mass % or more, the (meth)acrylic ester including one or more (meth)acrylic esters selected from the group consisting of a (meth)acrylic ester of an aliphatic alcohol having two or more carbon atoms and a (meth)acrylic ester of an aromatic alcohol, and the blend amounts of a plasticizer and the acrylic polymer were set to 110 parts by mass or more and 150 parts by mass or less, and 4 parts by mass or more and 23 parts by mass or less, respectively, with respect to 100 parts by mass of the polyvinyl chloride (A), a polyvinyl chloride molded body obtained by molding the polyvinyl chloride composition had high flexibility after heat aging (had high heat aging resistance) as well as having favorable surface characteristics (had a low kinetic friction coefficient). This means that, the lower the kinetic friction coefficient of the polyvinyl chloride molded body is, the less sticky the polyvinyl chloride molded body is.

There is no particular limitation on the average degree of polymerization of the polyvinyl chloride (A) as long as it is 1,350 or more. The average degree of polymerization is preferably 1,400 or more from the viewpoint of more easily forming the powder of the polyvinyl chloride composition. In addition, there is no particular limitation on the upper limit of the average degree of polymerization of the polyvinyl chloride (A), and it may be 3,800 or less, for example. The average degree of polymerization is preferably 3,500 or less, and more preferably 3,000 or less, from the viewpoint of improving the flexibility of a polyvinyl chloride molded body obtained by molding the polyvinyl chloride composition. More specifically, the average degree of polymerization of the polyvinyl chloride (A) is preferably 1,350 or more and 3,800 or less, more preferably 1,350 or more and 3,500 or less, and even more preferably 1,400 or more and 3,000 or less. In the present invention, the average degree of polymerization of the polyvinyl chloride (A) is measured in accordance with JIS K 6720-2:1999.

There is no particular limitation on the average particle diameter of the polyvinyl chloride (A) as long as it is 50 μm or more and 500 μm or less, and for example, it is preferably 100 μm or more, and more preferably 150 μm or more. The average particle diameter of the polyvinyl chloride (A) is preferably 300 μm or less, and more preferably 200 μm or less, for example. More specifically, the average particle diameter of the polyvinyl chloride (A) is preferably 100 μm or more and 300 μm or less, more preferably 100 pin or more and 200 μm or less, and even more preferably 150 μm or more and 200 μm or less, for example. When the average particle diameter of the polyvinyl chloride (A) is within the above-described range, the fluidity of the powder of the polyvinyl chloride composition is improved, and the adhesiveness of a polyvinyl chloride molded body obtained by molding the polyvinyl chloride composition to a urethane foam layer is improved. In the present invention, the average particle diameter of the polyvinyl chloride (A) is measured in accordance with JIS K 7369:2009.

There is no particular limitation on the polyvinyl chloride (A), and a homopolymer of a vinyl chloride monomer and/or a copolymer of a vinyl chloride monomer and another copolymerizable monomer can be used. Examples of the other copolymerizable monomer include, but are not particularly limited to, ethylene, propylene, vinyl acetate, allyl chloride, allyl glycidyl ether, acrylic ester, and vinyl ether.

The polyvinyl chloride (A) may be manufactured using any known polymerization method such as a suspension polymerization method or a bulk polymerization method, and for example, is preferably manufactured using a suspension polymerization method from the viewpoint of low cost and excellent thermal stability.

The polyvinyl chloride composition for powder molding may contain the polyvinyl chloride (A) in an amount of 30 mass % or more or 35 mass % or more, for example, but there is no particular limitation thereto. The polyvinyl chloride composition for powder molding may contain the polyvinyl chloride (A) in an amount of 60 mass % or less, or 55 mass % or less, or 50 mass % or less, or 45 mass % less. More specifically, the polyvinyl chloride composition for powder molding may contain the polyvinyl chloride (A) in an amount of 30 mass % or more and 60 mass % or less, or 35 mass % or more and 55 mass % or less, for example.

There is no particular limitation on the blend amount of the acrylic polymer in the polyvinyl chloride composition for powder molding as long as the blend amount is 4 parts by mass or more and 23 parts by mass or less with respect to 100 parts by mass of the polyvinyl chloride (A), and for example, the blend amount is preferably 5 parts by mass or more, more preferably 7 parts by mass or more, and even more preferably 9 parts by mass or more, from the viewpoint of reducing the kinetic friction coefficient to improve the surface characteristics and suppressing a change in flexibility due to heat aging. The blend amount of the acrylic polymer is preferably 22 parts by mass or less, and more preferably 20 parts by mass or less, with respect to 100 parts by mass of the polyvinyl chloride (A), from the viewpoint of improving the flexibility and flexibility after heat aging. More specifically, the blend amount of the acrylic polymer is preferably 5 parts by mass or more and 22 parts by mass or less, and more preferably 7 parts by mass or more and 20 parts by mass or less, with respect to 100 parts by mass of the polyvinyl chloride (A).

There is no particular limitation on the average particle diameter of the acrylic polymer as long as it is 0.01 μm or more and 10 μm or less, and for example, it is preferably 0.1 μm or more, and more preferably 0.5 μm or more. The average particle diameter of the acrylic polymer is preferably 5 μm or less, and more preferably 2 μm or less, for example. More specifically, the average particle diameter of the acrylic polymer is preferably 0.1 μm or more and 5 μm or less, and more preferably 0.5 μm or more and 2 μm or less, for example. When the average particle diameter of the acrylic polymer is within the above-described range, the fluidity of the powder of the polyvinyl chloride composition is improved. In the present invention, the average particle diameter of the acrylic polymer is measured using a dynamic light scattering type particle size distribution measurement apparatus.

The acrylic polymer contains a constitutional unit derived from (meth)acrylic ester in an amount of 50 mass % or more.

In other words, the acrylic polymer is obtained through polymerization of a monomer mixture containing (meth)acrylic ester in an amount of 50 mass % or more. In the present invention, "(meth)acrylic acid" means acrylic acid and/or methacrylic acid. Moreover, "(meth)acrylic ester" means acrylic ester and/or methacrylic ester. The acrylic polymer preferably contains a constitutional unit derived from (methacrylic ester in an amount of 60 mass % or more, more preferably 70 mass % or more, even more preferably 80 mass % or more, and even more preferably 90 mass % or more, from the viewpoint of improving the surface characteristics and flexibility of the molded body.

Examples of the (meth)acrylic ester include a (methacrylic ester of an aliphatic alcohol and a (methacrylic ester of an aromatic alcohol. In the (meth)acrylic ester of an aliphatic alcohol, the aliphatic alcohol may be linear alcohol, or branched alcohol, or cyclic alcohol.

The (meth)acrylic ester includes at least one (meth)acrylic ester selected from the group consisting of the (meth)acrylic ester of an aliphatic alcohol having two or more carbon atoms and the (meth)acrylic ester of an aromatic alcohol. Therefore, the compatibility between the acrylic polymer and the plasticizer is improved, thus making it possible to suppress movement of the plasticizer to the surface of the polyvinyl chloride molded body. Examples of the (meth)acrylic ester of an aliphatic alcohol having two or more carbon atoms, namely (meth)acrylic esters including an alkyl group having two or more carbon atoms, include, but are not particularly limited to, ethyl (meth)acrylate, n-propyl (meth)acrylate, isopropyl (meth)acrylate, n-butyl (meth)acrylate, isobutyl (methacrylate, tert-butyl (meth)acrylate, n-pentyl (meth)acrylate, n-hexyl (meth)acrylate, n-heptyl (methacrylate, n-octyl (meth)acrylate, 2-ethylhexyl (meth)acrylate, nonyl (meth)acrylate, decyl (meth)acrylate, dodecyl (meth)acrylate, stearyl (meth)acrylate, cyclohexyl (meth)acrylate, and glycidyl (meth)acrylate, Examples of the (meth)acrylic ester of an aromatic alcohol include, but are not particularly limited to, phenyl (meth)acrylate and benzyl (meth)acrylate. These compounds may be used alone or in combination of two or more. There is no particular limitation, but it is preferable that the (meth)acrylic ester includes a (meth)acrylic ester of an aliphatic alcohol having two or more carbon atoms from the viewpoint that a molded body having favorable surface characteristics can be easily obtained.

In the (meth)acrylic ester of an aliphatic alcohol having two or more carbon atoms, there is no particular limitation on the number of carbon atoms included in the aliphatic alcohol, but the number of carbon atoms is preferably 2 or more and 24 or less from the viewpoint that a molded body having favorable surface characteristics can be easily obtained, and more preferably 2 or more and 12 or less and even more preferably 2 or more and 8 or less from the viewpoint of facilitating emulsion polymerization or fine suspension polymerization. Moreover, the (meth)acrylic ester of an aliphatic alcohol having two or more carbon atoms is preferably at least one of a (meth)acrylic ester of an aliphatic alcohol having 4 carbon atoms selected from the group consisting of n-butyl (methacrylate, isobutyl (meth)acrylate, and tert-butyl (methacrylate, from the viewpoint of further improving the surface characteristics of the molded body, and more preferably n-butyl (methacrylate and/or isobutyl (meth)acrylate. In addition, the (meth)acrylic ester of an aliphatic alcohol having two or more carbon atoms may include cyclohexyl (meth)acrylate from the viewpoint of further improving the surface characteristics of the molded body. Furthermore, the (meth)acrylic ester of an aliphatic alcohol having two or more carbon atoms is preferably one or more selected from the group consisting of isobutyl (meth)acrylate and cyclohexyl (meth)acrylate from the viewpoint of excellent powder characteristics.

The (meth)acrylic ester may include a (meth)acrylic ester of an aliphatic alcohol having one carbon atom, such as methyl (meth)acrylate.

The acrylic polymer may contain a constitutional unit derived from another monomer in addition to the constitutional unit derived from the (meth)acrylic ester. Examples of the other monomer include carboxyl group-containing monomers, sulfonic group-containing monomers, carbonyl group-containing (meth)acrylates, hydroxyl group-containing (meth)acrylates, epoxy group-containing (meth)acrylates, and amino group-containing (meth)acrylates. Examples of the carboxyl group-containing monomers include methacrylic acid, acrylic acid, itaconic acid, crotonic acid, maleic acid, fumaric acid, 2-succinoloyloxyethyl methacrylate, 2-maleinoyloxyethyl methacrylate, 2-phthaloyloxyethyl methacrylate, and 2-hexahydrophthaloyloxyethyl methacrylate. Examples of the sulfonic group-containing monomers include allylsulfonic acid. Examples of the carbonyl group-containing (meth)acrylates include acetoacetoxyethyl (meth)acrylate. Examples of the hydroxyl group-containing (meth)acrylates include 2-hydroxyethyl (meth) acrylate and 2-hydroxypropyl (meth)acrylate. Examples of the epoxy group-containing (meth)acrylates include glycidyl (meth)acrylate. Examples of the amino group-containing (meth)acrylates include N-dimethylaminoethyl (meth)acrylate and N-diethylaminoethyl (meth)acrylate. Of these, methacrylic acid and acrylic acid are favorably used from the viewpoint of low cost and excellent polymerizability with the (meth)acrylic ester.

It is preferable that the acrylic polymer contains the constitutional unit derived from methyl (meth)acrylate in an amount of 40 mass % or more and 95 mass % or less, and the constitutional unit derived from at least one (meth/acrylic ester selected from the group consisting of n-butyl (meth)acrylate, isobutyl (meth)acrylate, and tert-butyl (meth)acrylate in an amount of 5 mass % or more and 60 mass % or less, from the viewpoint of improving the surface characteristics of a vinyl chloride molded body and improving flexibility after heat aging. It is more preferable that the acrylic polymer contains the constitutional unit derived from methyl (meth)acrylate in an amount of 50 mass % or more and 95 mass % or less, and the constitutional unit derived from at least one (meth)acrylic ester selected from the group consisting of n-butyl (meth)acrylate, isobutyl (meth)acrylate, and tert-butyl (meth)acrylate in an amount of 5 mass % or more and 50 mass % or less, from the viewpoint of improving the blocking properties of the polyvinyl chloride composition (powder), and it is even more preferable that the acrylic polymer contains the constitutional unit derived from methyl (meth)acrylate in an amount of GO mass % or more and 95 mass % or less, and the constitutional unit derived from at least one (meth)acrylic ester selected from the group consisting of n-butyl (meth)acrylate, isobutyl (meth)acrylate, and tert-butyl (meth)acrylate in an amount of 5 mass % or more and 40 mass % or less. The acrylic polymer may contain a constitutional unit derived from another monomer component in addition to the constitutional unit derived from methyl (meth)acrylate and the constitutional unit derived from the (meth/acrylic ester of the aliphatic alcohol having 4 carbon atoms. The content of the constitutional unit derived from the other monomer component in the acrylic polymer is preferably 5 mass % or less.

There is no particular limitation on the mass average molecular weight (Mw; also referred to as "weight average molecular weight") of the acrylic polymer, it may be 50,000 or more and 2,500,000 or less. The mass average molecular weight is preferably 150,000 or more, more preferably 300,000 or more, and even more preferably 350,000 or more, from the viewpoint of improving flexibility after heat aging. The mass average molecular weight is preferably 1,350,000 or less, more preferably 1,300,000 or less, and even more preferably 1,200,000 or less, from the viewpoint of improving flexibility after heat aging. More specifically, the mass average molecular weight of the acrylic polymer is preferably 150,000 or more and 1,350,000 or less, more preferably 300,000 or more and 1,300,000 or less, and even more preferably 350,000 or more and 1,200,000 or less. In the present invention, the mass average molecular weight of the acrylic polymer is measured using GPC (Gel Permeation Chromatography).

Although the acrylic polymer may be manufactured using any known polymerization method such as an emulsion polymerization method, a seed emulsion polymerization method, a fine suspension polymerization method, or a seed fine suspension polymerization method, it is preferable to use an emulsion polymerization method or fine suspension polymerization method from the viewpoint that such a method facilitates control of the molecular weight, particle structure, and particle diameter and is suitable for industrial production. In the polymerization methods, a polymerization initiator, a surfactant (functioning as an emulsifying agent and/or a dispersing agent), a chain transfer agent, and the like can be used as appropriate.

There is no particular limitation on the polymerization initiator, but sodium persulfate, potassium persulfate, and ammonium persulfate can be used, for example.

There is no particular limitation on the surfactant, but anionic surfactants such as fatty acid salts, alkyl sulfosuccinates, alkyl sarcosinates, alkyl sulfates, and alkylbenzene sulfonates, nonionic surfactants such as polyoxyethylene alkyl ethers, polyoxyethylene fatty acid esters, and glycerin fatty acid esters, and cationic surfactants such as alkylamine salts can be used as appropriate, for example.

There is no particular limitation on the chain transfer agent, but favorable examples include alkyl mercaptans having 2 to 12 carbon atoms in their main chain, and mercapto alcohols. Examples of the alkyl mercaptans having 2 to 12 carbon atoms in their main chain include n-octyl mercaptan (also referred to as "1-octanethiol"), t-octyl mercaptan, n-dodecyl mercaptan, t-dodecyl mercaptan, and 2-ethylhexyl thioglycol. Examples of the mercapto alcohols include 2-mercaptoethanol.

The acrylic polymer may be in the form of particles having a uniform structure, or core-shell particles having a core-shell structure. When the acrylic polymer is in the form of core-shell particles, the mass ratio between the core portion and the shell portion may be within a range from 10:90 to 90:10, for example, but there is no particular limitation thereto.

When the acrylic polymer is in the form of particles having a uniform structure, the acrylic polymer can be produced through spray drying of a latex of a polymer obtained through polymerization of a monomer mixture (also referred to as "one-step polymerization"). When the acrylic polymer is in the form of core-shell particles, the acrylic polymer can be produced by forming a latex of a polymer (core portion) through polymerization of a monomer mixture, adding the additional monomer mixture to the thus-obtained latex and continuing to perform polymerization to form a latex of a polymer (having a core-shell structure), and then performing spray drying (also referred to as "two-step polymerization"). The polymerization of the core portion and/or the shell portion may be performed through two or more steps.

In the polyvinyl chloride composition for powder molding, there is no particular limitation on the blend amount of the plasticizer as long as the blend amount is 110 parts by mass or more and 150 parts by mass or less with respect to 100 parts by mass of the polyvinyl chloride (A), and for example, it is preferably 115 parts by mass or more from the viewpoint of improving the heat aging resistance of the polyvinyl chloride molded body. The blend amount is preferably 145 parts by mass or less from the viewpoint of facilitating the formation of powder of the polyvinyl chloride composition. More specifically, the blend amount of the plasticizer is preferably 115 parts by mass or more and 150 parts by mass or less, and more preferably 115 parts by mass or more and 145 parts by mass or less, with respect to 100 parts by mass of the polyvinyl chloride (A).

There is no particular limitation on the plasticizer as long as a plasticizer for a polyvinyl chloride is used. For example, trimellitate-based plasticizers, phthalic acid-based plasticizers, pyromellitic acid-based plasticizers, epoxy-based plasticizers, polyester-based plasticizers, and aliphatic series-based plasticizers can be used. It is preferable to use trimellitate-based plasticizers from the viewpoint that the plasticizers are less likely to move and bleed out, and the heat aging resistance is further improved.

Examples of the trimellitate-based plasticizers include, but are not particularly limited to, tri(2-ethylhexyl) trimellitate, tri(n-octyl) trimellitate, triisooctyl trimellitate, triisodecyl trimellitate, triisononyl trimellitate, di(n-octyl) mono (n-decyl) trimellitate, and diisooctyl monoisodecyl trimellitate.

Examples of the phthalic acid-based plasticizers include, but are not particularly limited to, di(n-butyl) phthalate, di(n-octyl) phthalate, di(2-ethylhexyl) phthalate, diisooctyl phthalate, octyldecyl phthalate, diisodecyl phthalate, butylbenzyl phthalate, and di(2-ethylhexyl) isophthalate.

Examples of the pyromellitic acid-based plasticizers include, but are not particularly limited to, tetra(2-ethylhexyl) pyromellitate and tetra(n-octyl) pyromellitate. Examples of the epoxy-based plasticizers include, but are not particularly limited to, epoxidized soybean oil, epoxidized flaxseed oil, and epoxidized (2-ethylhexyl) tall oil fatty acid. Examples of the polyester-based plasticizers include, but are not particularly limited to, (1,3-butanediol) (2-ethylhexanol) adipate-based polyester, (1,6-hexanediol) (2-ethylhexana sebacate-based polyester, and (propylene glycol) (coconut oil fatty acid) adipate-based polyester.

The aliphatic series-based plasticizers may also be fatty acid ester-based plasticizers. Specifically, one or more selected from the group consisting of sebacates, azelates, and adipates can be used as the aliphatic series-based plasticizers, for example. More specifically, one or more selected from the group consisting of (2-ethylhexyl) sebacate (DOS), di(2-ethythexyl) azelate (DOZ), di(2-ethylhexyl) adipate (DOA), diisodecyl adipate (DIDA), and diisononyl adipate (DINA) can be used as the aliphatic series-based plasticizers, for example.

The above-described plasticizers may be used alone or in combination of two or more.

The polyvinyl chloride composition for powder molding may further contain a polyvinyl chloride (B) having an average particle diameter of 0.01 μm or more and less than 50 μm from the viewpoint of imparting flexibility, which is expressed as the tension characteristics under the application of 10% stress, for example. There is no particular limitation on the average particle diameter of the polyvinyl chloride (B). For example, it is preferably 0.1 µm or more, and more preferably 0.5 µm or more. The average particle diameter of the polyvinyl chloride (B) is preferably 20 µm or less, and more preferably 10 µm or less, for example. More specifically, the average particle diameter of the polyvinyl chloride (B) is preferably 0.1 µm or more and 20 µm or less, and more preferably 0.5 µm or more and 10 µm or less, for example. When the average particle diameter of the polyvinyl chloride (B) is within the above-described range, the fluidity of the powder of the polyvinyl chloride composition is improved. In the present invention, the average particle diameter of the polyvinyl chloride (B) is measured using a laser diffraction-scattering type particle size distribution measurement apparatus such as a particle size distribution measurement apparatus (MICROTRAC/HRA (9320-X100) manufactured by Nikkiso Co., Ltd.).

There is no particular limitation on the average degree of polymerization of the polyvinyl chloride (B), and it may be 500 or more, or 800 or more, for example. There is no particular limitation on the upper limit of the average degree of polymerization of the polyvinyl chloride (B), and it may be 2,000 or less, or 1,500 or less, for example. More specifically, the average degree of polymerization of the polyvinyl chloride (B) may be 500 or more and 2,000 or less, or 800 or more and 1,500 or less, for example. When the average degree of polymerization of the polyvinyl chloride (B) is within the above-described range, the fluidity of the powder of the polyvinyl chloride composition is improved, and the moldability is also improved. In this specification, the average degree of polymerization of the polyvinyl chloride (B) is measured in accordance with JIS K 6720-2:1999.

There is no particular limitation on the polyvinyl chloride (B), for example, a homopolymer of a vinyl chloride monomer and/or a copolymer of a vinyl chloride monomer and another copolymerizable monomer can be used. Examples of the other copolymerizable monomer include, but are not limited to, ethylene, propylene, vinyl acetate, allyl chloride, allyl glycidyl ether, acrylic ester, and vinyl ether.

Although the polyvinyl chloride (B) may be manufactured using any known polymerization method such as an emulsion polymerization method, a seed emulsion polymerization method, a fine suspension polymerization method, or a seed fine suspension polymerization method, it is preferable to manufacture the polyvinyl chloride (B) using a fine suspension polymerization method from the viewpoint that fine particles can be easily formed.

In the polyvinyl chloride composition for powder molding, the blend amount of the polyvinyl chloride (B) is preferably 36 parts by mass or less, more preferably 30 parts by mass or less from the viewpoint of reducing the kinetic friction coefficient, and even more preferably 20 parts by mass or less, with respect to 100 parts by mass of the polyvinyl chloride (A). The lower limit of the blend amount of the polyvinyl chloride (B) may be 3 parts by mass or more, or 5 parts by mass or more, from the viewpoint of improving the fusibility. When the blend amount of the polyvinyl chloride (B) with respect to the polyvinyl chloride (A) is within the above-described range, the fluidity of the powder of the polyvinyl chloride composition is improved.

In the polyvinyl chloride composition for powder molding, the total blend amount of the acrylic polymer and polyvinyl chloride (B) is preferably 15 parts by mass or more and 40 parts by mass or less, more preferably 15 parts by mass or more and 35 parts by mass or less, and even more preferably 15 parts by mass or more and 30 parts by mass or less, with respect to 100 parts by mass of the polyvinyl chloride (A), from the viewpoint of reducing the kinetic friction coefficient of the polyvinyl chloride molded body and improving the post-heating flexibility.

The polyvinyl chloride composition for powder molding may contain an acrylic modified polyorganosiloxane from the viewpoint of further reducing the kinetic friction coefficient of the molded body and improving the surface characteristics, and the blend amount of the acrylic modified polyorganosiloxane may be 0.5 parts by mass or more, or 1 part by mass or more, with respect to 100 parts by mass of the polyvinyl chloride (A), for example. The blend amount of the acrylic modified polyorganosiloxane is preferably 5 parts by mass or less, and more preferably 4 parts by mass or less, with respect to 100 parts by mass of the polyvinyl chloride (A), from the viewpoint of improving the post-heating flexibility. More specifically, the blend amount of the acrylic modified polyorganosiloxane may be 0.5 parts by mass or more and 5 parts by mass or less, or 1 part by mass or more and 5 parts by mass or less, or 1 part by mass or more and 4 parts by mass or less, with respect to 100 parts by mass of the polyvinyl chloride (A).

In the present invention, the content of silicone (polyorganosiloxane) in the acrylic modified polyorganosiloxane is 60 mass % or more. The acrylic modified polyorganosiloxane functions as a lubricant.

Acrylic modified polyorganosiloxane obtained through emulsion graft copolymerization of polyorganosiloxane and (meth)acrylic ester may be used as the acrylic modified polyorganosiloxane, for example.

Examples of the polyorganosiloxane include compounds represented by General Formula (I) below.

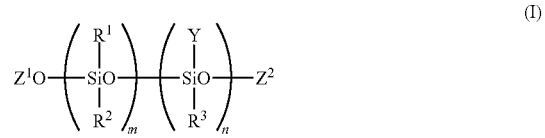

In General Formula (I), $R^1$, $R^2$, and $R^3$ are the same as or different from each other and are individually a hydrocarbon group or a halogenated hydrocarbon group having 1 to 20 carbon atoms. The hydrocarbon group may be an alkyl group or aryl group (e.g., an aryl group having 6 to 10 carbon atoms), for example. The halogenated hydrocarbon group may be a halogenated alkyl group or halogenated aryl group (e.g., a halogenated aryl group having 6 to 10 carbon atoms), for example.

In General Formula (I), Y is a radical reactive group, an SH group, an organic group including a radical reactive group, or an organic group including an SH group. The radical reactive group may be a vinyl group, an allyl group, a γ-acryloxypropyl group, a γ-methacryloxypropyl group, or a γ-mercaptopropyl group, for example.

In General Formula (I), $Z^1$ and $Z^2$ are the same as or different from each other and are individually a hydrogen atom, a lower alkyl group, or a triorganosilyl group. The lower alkyl group may be an alkyl group having 1 to 4 carbon atoms, for example. The triorganosilyl group may be a triorganosilyl group represented by General Formula (II) below, for example.

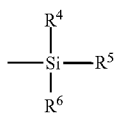

(II)

In General Formula (II), $R^4$ and $R^5$ are the same as or different from each other and are individually a hydrocarbon group or a halogenated hydrocarbon group having 1 to 20 carbon atoms. The hydrocarbon group may be an alkyl group or aryl group (e.g., an aryl group having 6 to 10 carbon atoms), for example. The halogenated hydrocarbon group may be a halogenated alkyl group or halogenated aryl group (e.g., a halogenated aryl group having 6 to 10 carbon atoms), for example.

In General Formula (II), $R^6$ is a hydrocarbon group having 1 to 20 carbon atoms, a halogenated hydrocarbon group, a radical reactive group, an SH group, an organic group including a radical organic group, or an organic group including an SH group. The hydrocarbon group having 1 to 20 carbon atoms may be an alkyl group or aryl group (e.g., an aryl group having 6 to 10 carbon atoms), for example. The halogenated hydrocarbon group may be a halogenated alkyl group or halogenated aryl group (e.g., a halogenated aryl group having 6 to 10 carbon atoms), for example. The radical reactive group may be a vinyl group, an allyl group, a γ-acryloxypropyl group, a γ-methacryloxypropyl group, or a γ-mercaptopropyl group, for example.

In General Formula (I), m is a positive integer that is smaller than or equal to 10,000 (e.g., 500 to 8,000), and n is an integer that is greater than or equal to 1 (e.g., 1 to 500).

The (meth)acrylic ester may be (methacrylic ester represented by General Formula (III) below, for example.

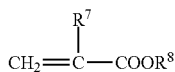

(III)

In General Formula (III), $R^7$ is a hydrogen atom or a methyl group, and $R^8$ is an alkyl group (e.g., an alkyl group having 1 to 18 carbon atoms), an alkoxy-substituted alkyl group (e.g., an alkoxy-substituted alkyl group having 3 to 6 carbon atoms), a cycloalkyl group (e.g., a cycloalkyl group having 6 or 7 carbon atoms), or an aryl group (e.g., an aryl group having 6 to 10 carbon atoms).

The average particle diameter of the acrylic modified polyorganosiloxane may be 0.1 μm or more and 100 μm or less, or 1 μm or more and 100 μm or less, or 5 μm or more and 100 μm or less, or 0.1 μm or more and 80 μm or less, or 0.1 μm or more and less than 50 μm. In the present invention, the average particle diameter of the acrylic modified polyorganosiloxane is measured using a laser diffraction-scattering type particle size distribution measurement apparatus such as a particle size distribution measurement apparatus (MICROTRAC/HRA (9320-X100) manufactured by Nikkiso Co., Ltd.).

Commercially available products such as a silicone/acrylic hybrid resin (CHALINE (registered trademark)) manufactured by Nissin Chemical Industry Co., Ltd. can be used as the acrylic modified polyorganosiloxane, for example.

The polyvinyl chloride composition for powder molding may further contain resin compounding agents such as a stabilizer, a coloring agent, an antioxidant, a filler, and an ultraviolet absorber as appropriate. In addition, the polyvinyl chloride composition for powder molding may also contain a lubricant other than acrylic modified polyorganosiloxane as appropriate.

Epoxy-based stabilizers, barium-based stabilizers, calcium-based stabilizers, tin-based stabilizers, zinc-based stabilizers, hindered amine-based light stabilizers, and composite stabilizers such as calcium-zinc-based (Ca—Zn-based) stabilizers and barium-zinc-based (Ba—Zn-based) stabilizers can also be used as the stabilizer, for example. The stabilizers may be used alone or in combination of two or more. The blend amount of the stabilizer is preferably 0.01 parts by mass or more and 8 parts by mass or less with respect to 100 parts by mass of the polyvinyl chloride (A).

Examples of the coloring agent include titanium oxide, zinc oxide, and carbon black. Commercially available pigments such as blue pigments or red pigments may also be used as the coloring agent. The coloring agents may be used alone or in combination of two or more.

The polyvinyl chloride composition for powder molding can be manufactured by mixing the polyvinyl chloride (A), the acrylic polymer, and the plasticizer, and optionally the polyvinyl chloride (B), the acrylic modified polyorganosiloxane, and other resin compounding agents as appropriate. There is no particular limitation on the mixing method, and for example, a dry blending method is preferable. There is no particular limitation on the mixer, and for example a super mixer or the like can be used.

The average particle diameter of the polyvinyl chloride composition for powder molding is not particularly limited, and for example, it may be 50 μm or more, 60 μm or more, 100 μm or more, or 150 μm or more. The average particle diameter of the polyvinyl chloride composition for powder molding is not particularly limited, and for example, it may be 500 μm or less, 300 μm or less, or 200 μm or less. More specifically, the average particle diameter of the polyvinyl chloride composition for powder molding may be 50 μm or more and 500 μm or less, and for example, is preferably 100 μm or more and 300 μm or less, more preferably 100 μm or more and 200 μm or less, and even more preferably 150 μm or more and 200 μm or less, from the viewpoint of the fluidity of powder. The average particle diameter of the polyvinyl chloride composition for powder molding is measured in accordance with JIS K 7369:2009.

There is no particular limitation on the adhesive power of the polyvinyl chloride composition for powder molding, and it is preferably 250 gf/cm² (24.5 kPa) or less, more preferably 200 gf/cm² or less, even more preferably 150 gf/cm² or less, even more preferably 100 gf/cm² or less, and even more preferably 50 gf/cm² or less, from the viewpoint of achieving excellent blocking properties. In the present invention, adhesive power is measured and calculated as described later.

The polyvinyl chloride molded body is obtained by molding the polyvinyl chloride composition for powder molding through powder slush molding. Therefore the composition of the polyvinyl chloride molded body is the same as that of the polyvinyl chloride composition for powder molding. When the cross section of the polyvinyl chloride molded body is observed, an interface between the polyvinyl chloride compositions for powder molding (polyvinyl chloride particles) used in powder slush molding is confirmed. Thus, it is possible to confirm that the molded body is manufactured through powder slush molding, that is, the molded body is a powder slush molded body.

Although there is no particular limitation on the powder slush molding method, a method as described below can be used. That is, a slush molding machine including a powder box and a mold for slush molding (also referred to simply as "mold" hereinafter) is prepared, and the polyvinyl chloride composition for powder molding is introduced into the powder box, while the mold is heated to a predetermined temperature (e.g., 230° C. or higher and 280° C. or lower). Next, the slush molding machine is inverted to bring the polyvinyl chloride composition for powder molding into contact with the surface of the mold heated to the predetermined temperature, and is kept in this state for a predetermined period of time (e.g., 3 seconds or more and 15 seconds or less). Thereafter, the slush molding machine is inverted again, and the mold is cooled (to a temperature of 10° C. or higher and 60° C. or lower, for example). Then, a molded body is removed from the cooled mold.

There is no particular limitation on the shape of the polyvinyl chloride molded body, and for example, it may be formed in a sheet-like shape. When the polyvinyl chloride molded body has a sheet-like shape (in this case, the molded body is also referred to as "polyvinyl chloride sheet" hereinafter), there is no particular limitation on its thickness, and for example it may have a thickness of 3.0 mm or less, or 2.0 mm or less, or 1.6 mm or less. In addition, it may have a thickness of 0.5 mm or more, or 0.6 mm or more, or 0.8 mm or more. More specifically, if the polyvinyl chloride molded body has a sheet-like shape, it may have a thickness of 0.5 mm or more and 3.0 mm or less, or 0.6 mm or more and 2.0 mm or less, or 0.8 mm or more and 1.6 mm or less.

When measured in accordance with JIS K 7125:1999, for example, the kinetic friction coefficient of the polyvinyl chloride molded body is preferably 0.75 or less, more preferably 0.73 or less, even more preferably 0.68 or less, even more preferably 0.62 or less, even more preferably 0.57 or less, and even more preferably 0.52 or less.

After performing heat aging (after heating at 125° C. for 200 hours), the tension stress of the polyvinyl chloride molded body at an elongation percentage of 10% (also referred to as "10% tension stress" hereinafter) is preferably 14.0 MPa or less, more preferably 13.5 MPa or less, even more preferably 13.0 MPa or less, even more preferably 12.5 MPa or less, and even more preferably 12.0 MPa or less, for example. In the present invention, the tension test is performed in accordance with a modified method of K 6251: 2010 in which a distance between two chucks that hold a sample (polyvinyl chloride molded body) is employed instead of a distance between reference lines. A polyvinyl chloride molded body to be used for the tension test after heat aging can be prepared as follows. That is, a resin laminate formed by laminating a polyvinyl chloride molded body and a polyurethane foam layer is heated at 125° C. for 200 hours, and then the polyvinyl chloride molded body is removed from the resin laminate and used for the tension test.

The polyvinyl chloride molded body can be suitably used as a facing for a vehicle interior material such as that for an instrument panel, a door trim, a trunk trim, a seat, a pillar cover, a ceiling material, a rear tray, a console box, an air bag cover, an armrest, a headrest, a meter cover, or a crash pad, in a vehicle such as an automobile, but there is no particular limitation thereto.

The polyvinyl chloride molded body and a polyurethane foam layer (also referred to as "urethane foam molded body") can be laminated and used as a laminate. Examples of the lamination method include, but are not particularly limited to, a method in which a polyvinyl chloride molded body and a polyurethane foam molded body are separately produced and then attached to each other through thermal fusion bonding or thermal adhesion, or using a known adhesive; and an isocyanate, polyol, and the like, which are raw materials of a polyurethane foam molded body, are reacted and polymerized on a polyvinyl chloride molded body, and polyurethane is foamed using a known method to form a laminate. The latter method is preferable because the process is simple, and the polyvinyl chloride molded body and the polyurethane foam molded body can be reliably adhered to each other even when laminates with various shapes are formed.

The laminate may include a polyurethane foam layer, a polyvinyl chloride molded body (also referred to as "polyvinyl chloride layer") laminated on one surface of the polyurethane foam layer, and another resin layer laminated on the other surface of the polyurethane foam layer. The other resin layer may be a layer of a polyolefin-based resin (e.g., polypropylene and/or a polyethylene-polypropylene copolymer) or ABS (Acrylonitrile-Butadiene-Styrene) resin, for example. Such a laminate can be manufactured by foaming polyurethane between the polyvinyl chloride layer and the other resin layer, for example.

The laminate can be favorably used as a vehicle interior material such as that for an instrument panel, a door trim, a trunk trim, a seat, a pillar cover, a ceiling material, a rear tray, a console box, an air bag cover, an armrest, a headrest, a meter cover, or a crash pad, in a vehicle such as an automobile, but there is no particular limitation thereto.

EXAMPLES

Hereinafter, the present invention will be described more specifically by use of examples. However, the present invention is not limited to the following examples.

Manufacturing Example 1 of Acrylic Polymer

Into a 2-L polymerization apparatus including a stirrer, a reflux condenser, a thermometer, a nitrogen gas introduction pipe, and a feed pump, 380 g of deionized water was poured, and was heated under stirring in a nitrogen atmosphere. When the internal temperature reached 80° C., 23.5 g of 2% sodium persulfate was added thereto. Next, a monomer emulsion liquid produced by mixing and stirring 420.0 g of methyl methacrylate (MMA), 280.0 g of isobutyl methacrylate (iBMA), 2.5 g of sodium di-(2-ethylhexyl) sulfbsuccinate, 0.05 g of 1-octanethiol, and 230.0 g of deionized water was dripped thereinto for 2 hours, and the resulting mixture was stirred for another 2 hours at 80° C. after the dripping was finished. A latex was thus obtained. The thus-obtained latex was cooled to room temperature, and then an acrylic polymer A1 was manufactured by performing spray drying using a spray dryer (L-12-LS, manufactured by Ohkawara Kakohki Co., Ltd.) under conditions where the inlet temperature was 130° C., the outlet temperature was 60° C., and the atomizer disk rotation speed was 20,000 rpm.

Manufacturing Example 2 of Acrylic Polymer

An acrylic polymer A2 was manufactured in the same manner as in Manufacturing Example 1, except that the amounts of methyl methacrylate (MMA) and isobutyl methacrylate (iBMA) in the monomer emulsion liquid were changed to 525.0 g and 175.0 g, respectively.

Manufacturing Example 3 of Acrylic Polymer

An acrylic polymer A3 was manufactured in the same manner as in Manufacturing Example 1, except that the amounts of methyl methacrylate (MMA) and isobutyl methacrylate (iBMA) in the monomer emulsion liquid were changed to 560.0 g and 140.0 g, respectively.

Manufacturing Example 4 of Acrylic Polymer

An acrylic polymer A4 was manufactured in the same manner as in Manufacturing Example 1, except that the amounts of methyl methacrylate (MMA) and isobutyl methacrylate (iBMA) in the monomer emulsion liquid were changed to 595.0 g and 105.0 g, respectively.

Manufacturing Example 5 of Acrylic Polymer

An acrylic polymer A5 was manufactured in the same manner as in Manufacturing Example 1, except that the amounts of methyl methacrylate (MMA) and isobutyl methacrylate (iBMA) in the monomer emulsion liquid were changed to 630.0 g and 70.0 g, respectively.

Manufacturing Example 6 of Acrylic Polymer

An acrylic polymer A6 was manufactured in the same manner as in Manufacturing Example 1, except that the amounts of methyl methacrylate (MMA) and isobutyl methacrylate (iBMA) in the monomer emulsion liquid were changed to 665.0 g and 35.0 g, respectively.

Manufacturing Example 7 of Acrylic Polymer

An acrylic polymer A7 was manufactured in the same manner as in Manufacturing Example 1, except that the amounts of methyl methacrylate (MMA) and isobutyl methacrylate (iBMA) in the monomer emulsion liquid were changed to 280.0 g and 420.0 g, respectively.

Manufacturing Example 8 of Acrylic Polymer

An acrylic polymer A8 was manufactured in the same manner as in Manufacturing Example 1, except that the amount of methyl methacrylate (MMA) in the monomer emulsion liquid was changed to 700.0 g and isobutyl methacrylate (iBMA) was not used.

Manufacturing Example 9 of Acrylic Polymer

Into a 2-L polymerization apparatus including a stirrer, a reflux condenser, a thermometer, a nitrogen gas introduction pipe, and a feed pump, 380 g of deionized water was poured, and was heated under stirring in a nitrogen atmosphere. When the internal temperature reached 80° C., 17.5 g of 2% sodium persulfate was added thereto. Next, a monomer emulsion liquid (for a core portion) produced by mixing and stirring 200.0 g of methyl methacrylate (MMA), 150.0 g of n-butyl methacrylate (nBMA), 1.2 g of sodium di-(2-ethylhexyl) sulfosuccinate, and 120.0 g of deionized water was dripped thereinto for 1 hours, and the resulting mixture was stirred for another 80 minutes at 80° C. after the dripping was finished. A latex was thus obtained. Into the thus-obtained latex, 6.0 g of 2% sodium persulfate was added, and a monomer emulsion liquid (for a shell portion) produced by mixing and stirring 227.0 g of methyl methacrylate (MMA), 123.0 g of isobutyl methacrylate (iBMA), 1.4 g of sodium di-(2-ethylhexyl) sulfosuccinate, 0.05 g of 1-octanethiol, and 130.0 g of deionized water was dripped thereinto for 45 minutes, and the resulting mixture was stirred for another 30 minutes at 80° C. after the dripping was finished.

A two-step polymerization latex was thus obtained. The thus-obtained two-step polymerization latex was dried in the same manner as in Manufacturing Example 1, and an acrylic polymer B1 was thus obtained. In the acrylic polymer B1, the mass ratio between the core portion and the shell portion was 50:50.

Manufacturing Example 10 of Acrylic Polymer

An acrylic polymer C1 was manufactured in the same manner as in Manufacturing Example 1, except that 1-octanethiol was not added to the monomer emulsion liquid.

Manufacturing Example 11 of Acrylic Polymer

An acrylic polymer C2 was manufactured in the same manner as in Manufacturing Example 1, except that the amount of 1-octanethiol in the monomer emulsion liquid was increased to 0.25 g.

Manufacturing Example 12 of Acrylic Polymer

An acrylic polymer D1 was manufactured in the same manner as in Manufacturing Example 1, except that isobutyl methacrylate (iBMA) used in the monomer emulsion liquid was changed to n-butyl methacrylate (nBMA).

Manufacturing Example 13 of Acrylic Polymer

An acrylic polymer E1 was manufactured in the same manner as in Manufacturing Example 5, except that 70.0 g of isobutyl methacrylate (iBMA) in the monomer emulsion liquid was changed to 70.0 g of dodecyl methacrylate (DMA).

Manufacturing Example 14 of Acrylic Polymer

An acrylic polymer E2 was manufactured in the same manner as in Manufacturing Example 5, except that 70.0 g of isobutyl methacrylate (iBMA) in the monomer emulsion liquid was changed to 70.0 g of cyclohexyl methacrylate (CHMA).

Manufacturing Example 15 of Acrylic Polymer

An acrylic polymer E3 was manufactured in the same manner as in Manufacturing Example 5, except that 70.0 g of isobutyl methacrylate (iBMA) in the monomer emulsion liquid was changed to 70.0 g of benzyl methacrylate (BZMA).

The average particle diameters of the acrylic polymers A1 to A8, B1, C1 to C2, D1, and E1 to E3 were measured using a dynamic light scattering type particle size distribution measurement apparatus ("Nanotrac Wave-EX150" manufactured by MicrotracBEL Corp.). The mass average molecular weights (Mw) were measured using a high-speed GPC apparatus ("HCL-8220" manufactured by TOSOH Corporation; Columns: "TSR guard column HZ-H" and "TSR gel Super HZM-H" manufactured by TOSOH Corporation; GPC solvent: THF). Table 1 below shows the results.

TABLE 1

| Acrylic polymer | Monomer species | Polymerization method | Average particle diameter (μm) | Mw |
|---|---|---|---|---|
| A1 | MMA/iBMA | One step | 0.80 | 520,000 |
| A2 | MMA/iBMA | One step | 0.89 | 480,000 |
| A3 | MMA/iBMA | One step | 0.82 | 450,000 |
| A4 | MMA/iBMA | One step | 0.83 | 460,000 |
| A5 | MMA/iBMA | One step | 0.84 | 420,000 |
| A6 | MMA/iBMA | One step | 0.87 | 410,000 |
| A7 | MMA/iBMA | One step | 0.87 | 820,000 |
| A8 | MMA | One step | 0.82 | 260,000 |
| B1 | Core portion: MMA/nBMA Shell portion: MMA/iBMA | Two steps | 0.76 | 450,000 |
| C1 | MMA/iBMA | One step | 0.82 | 1,300,000 |
| C2 | MMA/iBMA | One step | 0.79 | 320,000 |
| D1 | MMA/nBMA | One step | 0.83 | 580,000 |
| E1 | MMA/DMA | One step | 0.63 | 310,000 |
| E2 | MMA/CHMA | One step | 0.69 | 360,000 |
| E3 | MMA/BZMA | One step | 0.86 | 340,000 |

Example 1

Manufacturing of Polyvinyl Chloride Composition for Powder Molding

Into a 100-L super mixer (manufactured by KAWATA MFG. Co., Ltd.), 100 parts by mass of the polyvinyl chloride (A) (vinyl chloride homopolymer with an average degree of polymerization of 1,700 and an average particle diameter of 152 μm; "KS-1700" manufactured by KANEKA Corporation), 120 parts by mass of a plasticizer (tri(n-octyl) trimellitate; "C-8L" manufactured by ADEKA Corporation), 5 parts by mass of zinc stearate as a stabilizer, 1.5 parts by mass of sodium perchlorate as a stabilizer, 0.3 parts by mass of a hindered amine-based light stabilizer (HALS) as a stabilizer, 5 parts by mass of epoxidized soybean oil as a stabilizer, and 3 parts by mass of a pigment (black) were introduced and mixed at 70° C. Next, the thus-obtained mixture was dried and then cooled to a temperature of 50° C. or lower. Then, 20 parts by mass of the acrylic polymer A1 was added thereto and mixed to produce a polyvinyl chloride composition for powder molding (powder).

Manufacturing of Polyvinyl Chloride Molded Body

Powder slush molding using the polyvinyl chloride composition for powder molding obtained as described above was performed using a box-type slush molding machine including a mold for slush molding provided with an embossed flat plate (with a length of 22 cm and a width of 31 cm) and a powder box (with a length of 22 cm, a width of 31 cm, and a depth of 16 cm). Specifically, first, 2 kg of the polyvinyl chloride composition for powder molding was introduced into the powder box, and the mold for slush molding heated to 280° C. was set in the slush molding machine. Next, when the temperature of the mold reached 260° C., the slush molding machine was inverted and the polyvinyl chloride composition for powder molding was held in the mold for about 10 to 12 seconds such that a polyvinyl chloride sheet (also referred to as "PVC sheet") had a thickness of 1.0 mm. Then, the slush molding machine was inverted. After 60 seconds, the mold was cooled to 50° C. using cooling water. Next, the PVC sheet was removed from the mold, and a polyvinyl chloride molded body was thus obtained.

Manufacturing of Laminate

The PVC sheet obtained as described above was placed on the bottom of a mold for foaming (190 mm×240 mm×11 mm). Next, a raw material solution prepared by mixing 36 g of liquid A containing 4,4'-diphenylmethane-diisocyanate and 78 g of liquid B containing polyether polyol (containing 1.0 mass % of triethylenediamine and 1.6 mass % of water) was poured onto the PVC sheet, and the mold was sealed. After a predetermined period of time, a laminate including the PVC sheet (facing) with a thickness of about 1 mm and a polyurethane foam layer (backing material) with a thickness of about 9 mm laminated on the PVC sheet was collected from the mold.

Example 2

A polyvinyl chloride composition for powder molding, a polyvinyl chloride molded body, and a laminate were produced in the same manner as in Example 1, except that 10 parts by mass of the acrylic polymer A1, and 10 parts by mass of the polyvinyl chloride (B) (vinyl chloride homopolymer with an average degree of polymerization of 1,300 and an average particle diameter of 10 μm; "PSM-31" manufactured by KANEKA Corporation) were used instead of 20 parts by mass of the acrylic polymer A1.

Example 3

A polyvinyl chloride composition for powder molding, a polyvinyl chloride molded body, and a laminate were produced in the same manner as in Example 1, except that 2 parts by mass of acrylic modified polysiloxane (a silicone/acrylic hybrid resin with an average particle diameter of 30 μm in which the silicone content is 80 mass % and the acrylic content is 20 mass %; "CHALINE (registered trademark) R-181S" manufactured by Nissin Chemical Industry Co., Ltd.) was further added to the mixture and mixed at 70° C.

Examples 4 to 7

Polyvinyl chloride compositions for powder molding, polyvinyl chloride molded 1.5 bodies, and laminates were produced in the same manner as in Example 3, except that the acrylic polymer A1 and the polyvinyl chloride (B) ("PSM-31" manufactured by KANEKA Corporation) in the blend amounts shown in Table 2 below were used instead of 20 parts by mass of the acrylic polymer A1.

Example 8

A polyvinyl chloride composition for powder molding, a polyvinyl chloride molded body, and a laminate were produced in the same manner as in Example 3, except that the acrylic polymer A1, the polyvinyl chloride (B) ("PSM-31" manufactured by KANEKA Corporation), and the polyvinyl chloride (B) (vinyl chloride homopolymer with an average degree of polymerization of 1,000 and an average particle diameter of 10 μm; "PSL-31" manufactured by KANEKA Corporation) in the blend amounts shown in Table 2 below were used instead of 20 parts by mass of the acrylic polymer A1.

Examples 9 to 12, 15 to 20

Polyvinyl chloride compositions for powder molding, polyvinyl chloride molded bodies, and laminates were produced in the same manner as in Example 6, except that acrylic polymers shown in Table 2 to Table 4 below were used instead of the acrylic polymer A1.

Example 13

A polyvinyl chloride composition for powder molding, a polyvinyl chloride molded body, and a laminate were produced in the same manner as in Example 8, except that a vinyl chloride homopolymer (with an average degree of polymerization of 1,400 and an average particle diameter of 159 μm; "B1004D" manufactured by KANEKA Corporation) was used as the polyvinyl chloride (A) and the blend amount of the plasticizer was changed to 110 parts by mass.

Example 14

A polyvinyl chloride composition for powder molding, a polyvinyl chloride molded body, and a laminate were produced in the same manner as in Example 1, except that 7 parts by mass of the acrylic polymer A1, and 13 parts by mass of the polyvinyl chloride (B) ("PSM-31" manufactured by KANEKA Corporation) were used instead of 20 parts by mass of the acrylic polymer A1.

Example 21

A polyvinyl chloride composition for powder molding, a polyvinyl chloride molded body, and a laminate were produced in the same manner as in Example 12, except that 125 parts by mass of the plasticizer was used.

Examples 22 to 24

Polyvinyl chloride compositions for powder molding, polyvinyl chloride molded bodies, and laminates were produced in the same manner as in Example 21, except that acrylic polymers shown in Table 4 below were used instead of the acrylic polymer A5.

Comparative Example 1

A polyvinyl chloride composition for powder molding, a polyvinyl chloride molded body, and a laminate were produced in the same manner as in Example 1, except that the polyvinyl chloride (B) ("PSM-31" manufactured by KANEKA Corporation) was used instead of the acrylic polymer A1.

Comparative Example 2

A polyvinyl chloride composition for powder molding, a polyvinyl chloride molded body, and a laminate were produced in the same manner as in Example 3, except that the blend amount of the acrylic polymer A1 was changed to 25 parts by mass.

Comparative Example 3

A polyvinyl chloride composition for powder molding, a polyvinyl chloride molded body, and a laminate were produced in the same manner as in Example 4, except that the blend amount of the acrylic polymer A1 was changed to 3 parts by mass, and the blend amount of the polyvinyl chloride (B) ("PSM-31" manufactured by KANEKA Corporation) was changed to 17 parts by mass.

Comparative Example 4

A polyvinyl chloride composition for powder molding, a polyvinyl chloride molded body, and a laminate were produced in the same manner as in Example 3, except that the polyvinyl chloride (B) ("PSM-31" manufactured by KANEKA Corporation) was used instead of the acrylic polymer A1.

Comparative Example 5

A polyvinyl chloride composition for powder molding, a polyvinyl chloride molded body, and a laminate were produced in the same manner as in Example 3, except that the polyvinyl chloride (B) ("PSL-31" manufactured by KANEKA Corporation) was used instead of the acrylic polymer A1.

Comparative Example 6

A polyvinyl chloride composition for powder molding, a polyvinyl chloride molded body, and a laminate were produced in the same manner as in Example 3, except that the acrylic polymer A8 was used instead of the acrylic polymer A1.

Comparative Example 7

A polyvinyl chloride composition for powder molding, a polyvinyl chloride molded body, and a laminate were produced in the same manner as in Example 13, except that the blend amount of the plasticizer was changed to 100 parts by mass.

Comparative Example 8

A polyvinyl chloride composition for powder molding, a polyvinyl chloride molded body, and a laminate were produced in the same manner as in Example 21, except that the acrylic polymer A8 was used instead of the acrylic polymer A5.

Regarding the examples and comparative examples, the adhesive power of the polyvinyl chloride composition for powder molding was measured as described below. Also, regarding the examples and comparative examples, the kinetic friction coefficient of the polyvinyl chloride molded body, the 10% tension stress, rupture stress, and rupture elongation in the initial state, and the 10% tension stress, rupture stress, and rupture elongation after heat aging were measured and evaluated as described below. Tables 2 to 4 below show the results.

Adhesive Power

After being filled with 40 g of the polyvinyl chloride composition for powder molding, a cylindrical cell with an inner diameter of 5 cm was heated at 30° C. in a constant-temperature oven. After the temperature of the polyvinyl chloride composition for powder molding rose to 30° C., a piston weighing 1.3 kg and a 5-kg weight (total load was 0.32 kgf/cm$^2$) were placed thereon. Then, the cylindrical cell, piston, and weight were kept at 60° C. in the constant-temperature oven for 2 hours. After 2 hours, these were taken out under the conditions of 23° C. and 50% RH and cooled for 1 hour. Then, the weight and piston were removed therefrom, and a cake of the polyvinyl chloride composition for powder molding was taken out of the cylindrical cell.

The crushing strength of the thus-obtained cake was measured using a 1.5 rheometer (RT-2010J-CW manufactured by RHEOTECH), and the adhesive power was calculated using the formula below.

Adhesive power (gf/cm$^2$)=2×B/(3.14×R×D)
B: Load (N) in crushing test
R: Diameter (mm) of cake
D: Thickness (mm) of cake Kinetic Friction Coefficient The measurements were performed in accordance with JIS K 7125:1999. Specifically, an NBR rubber sheet (black rubber), which is a partner material, was slid on the PVC sheet using a universal testing machine ("TENSILON" manufactured by A&D Co., Ltd.) with flat indenter specifications at a test rate of 100 mm/minute and a vertical load of 1.96 N under the conditions of 23° C. and 50% RH (relative humidity), and its kinetic friction was measured. Then, the kinetic friction coefficient was calculated therefrom. The kinetic friction coefficients that were smaller than or equal to 0.80 were acceptable.

10% Tension Stress, Rupture Stress, and Rupture Elongation in Initial State

The PVC sheet was punched into a No. 3 dumbbell shape to obtain a No. 3 dumbbell-shaped sample. Next, the two ends of this sample were held by two chucks (the distance between the chucks was 40 mm). After the sample was kept in a chamber at −10° C. for 3 minutes, a tension test was performed at a tension speed of 200 mm/minute to measure the 10% tension stress, rupture stress, and rupture elongation.

10% Tension Stress, Rupture Stress, and Rupture Elongation After Heat Aging

The laminate was placed into an oven and heated at 125° C. for 200 hours, and was thus subjected to heat aging. Thereafter, the PVC sheet was removed from the laminate. The removed PVC sheet was punched into a No. 3 dumbbell shape to obtain a No. 3 dumbbell-shaped sample. Next, the two ends of this sample were held by two chucks (the distance between the chucks was 40 mm). After the sample was kept in a chamber at −10° C. for 3 minutes, a tension test was performed at a tension speed of 200 mm/minute to measure the 10% tension stress, rupture stress, and rupture elongation. The PVC sheets were determined as being acceptable when the 10% tension stress was 14.0 MPa or less after heat aging.

TABLE 2

| | | | | | Example | | | | | |
|---|---|---|---|---|---|---|---|---|---|---|
| | | | | | 1 | 2 | 3 | 4 | 5 | 6 |
| Formulation of polyvinyl chloride composition | Polyvinyl chloride (A) | KS-1700 | Part | | 100 | 100 | 100 | 100 | 100 | 100 |
| | | S1004D | Part | | — | — | — | — | — | — |
| | Plasticizer | | Part | | 120 | 120 | 120 | 120 | 120 | 120 |
| | Acrylic modified polyorganosiloxane | | Part | | — | — | 2 | 2 | 2 | 2 |
| | Polyvinyl chloride (B) | PSL-31 | Part | | — | — | — | — | — | — |
| | | PSM-31 | Part | | — | 10 | — | 3 | 7 | 10 |
| | Acrylic polymer | A1 | MMA/iBMA = 60/40 | Part | 20 | 10 | 20 | 17 | 13 | 10 |
| | | A2 | MMA/iBMA = 75/25 | Part | — | — | — | — | — | — |
| | | A3 | MMA/iBMA = 80/20 | Part | — | — | — | — | — | — |
| | | A4 | MMA/iBMA = 85/15 | Part | — | — | — | — | — | — |
| | | A5 | MMA/iBMA = 90/10 | Part | — | — | — | — | — | — |
| Physical properties of polyvinyl chloride molded body | Kinetic friction coefficient | JIS K 7125 | — | | 0.506 | 0.625 | 0.467 | 0.475 | 0.477 | 0.485 |
| | Initial state | 10% tension stress | MPa | | 9.9 | 7.9 | 9.6 | 9.6 | 8.7 | 8.0 |
| | | Rupture stress | MPa | | 16.0 | 18.8 | 14.9 | 16.4 | 17.6 | 17.9 |
| | | Rupture elongation | % | | 68 | 138 | 60 | 76 | 96 | 118 |
| | After heat aging | 10% tension stress | MPa | | 13.3 | 10.6 | 12.9 | 12.3 | 12.3 | 11.1 |
| | | Rupture stress | MPa | | 18.1 | 19.3 | 17.9 | 18.5 | 19.5 | 19.2 |
| | | Rupture elongation | % | | 53 | 102 | 54 | 69 | 79 | 88 |
| | Rate of change of 10% tension stress (after aging − initial state)/initial state | | % | | 34.3 | 34.2 | 34.4 | 28.1 | 41.4 | 38.8 |
| Powder characteristics | Blocking properties | Adhesive power | gf/cm$^2$ | | <50 | <50 | <50 | <50 | <50 | <50 |

| | | | | | Example | | | | | |
|---|---|---|---|---|---|---|---|---|---|---|
| | | | | | 7 | 8 | 9 | 10 | 11 | 12 |
| Formulation of polyvinyl chloride composition | Polyvinyl chloride (A) | KS-1700 | Part | | 100 | 100 | 100 | 100 | 100 | 100 |
| | | S1004D | Part | | — | — | — | — | — | — |
| | Plasticizer | | Part | | 120 | 120 | 120 | 120 | 120 | 120 |
| | Acrylic modified polyorganosiloxane | | Part | | 2 | 2 | 2 | 2 | 2 | 2 |
| | Polyvinyl chloride (B) | PSL-31 | Part | | — | 10 | — | — | — | — |
| | | PSM-31 | Part | | 13 | 5 | 10 | 10 | 10 | 10 |
| | Acrylic polymer | A1 | MMA/iBMA = 60/40 | Part | 7 | 5 | — | — | — | — |
| | | A2 | MMA/iBMA = 75/25 | Part | — | — | 10 | — | — | — |
| | | A3 | MMA/iBMA = 80/20 | Part | — | — | — | 10 | — | — |
| | | A4 | MMA/iBMA = 85/15 | Part | — | — | — | — | 10 | — |
| | | A5 | MMA/iBMA = 90/10 | Part | — | — | — | — | — | 10 |

TABLE 2-continued

| Physical properties of polyvinyl chloride molded body | Kinetic friction coefficient | JIS K 7125 | — | 0.598 | 0.655 | 0.517 | 0.537 | 0.524 | 0.531 |
|---|---|---|---|---|---|---|---|---|---|
| | Initial state | 10% tension stress | MPa | 7.5 | 7.0 | 7.6 | 8.7 | 8.6 | 8.3 |
| | | Rupture stress | MPa | 18.1 | 18.9 | 18.4 | 17.8 | 17.1 | 17.0 |
| | | Rupture elongation | % | 129 | 149 | 122 | 117 | 104 | 103 |
| | After heat aging | 10% tension stress | MPa | 11.6 | 11.0 | 11.5 | 12.2 | 13.0 | 13.0 |
| | | Rupture stress | MPa | 20.6 | 21.0 | 20.3 | 19.1 | 19.6 | 19.8 |
| | | Rupture elongation | % | 93 | 103 | 95 | 82 | 91 | 69 |
| | | Rate of change of 10% tension stress (after aging − initial state)/initial state | % | 54.7 | 57.1 | 51.3 | 40.2 | 51.2 | 56.6 |
| Powder characteristics | Blocking properties | Adhesive power | gf/cm² | <50 | <50 | <50 | <50 | <50 | <50 |

TABLE 3

| | | | | Example | | | | Comparative Example | |
|---|---|---|---|---|---|---|---|---|---|
| | | | | 13 | 14 | 15 | 16 | 1 | 2 |
| Formulation of polyvinyl chloride composition | Polyvinyl chloride (A) | KS-1700 | Part | — | 100 | 100 | 100 | 100 | 100 |
| | | S1004D | Part | 100 | — | — | — | — | — |
| | Plasticizer | | Part | 110 | 120 | 120 | 120 | 120 | 120 |
| | Acrylic modified polyorganosiloxane | | Part | 2 | — | 2 | 2 | — | 2 |
| | Polyvinyl chloride (B) | PSL-31 | Part | 10 | — | — | — | — | — |
| | | PSM-31 | Part | 5 | 13 | 10 | 10 | 20 | — |
| | Acrylic polymer | A1 MMA/iBMA = 60/40 | Part | 5 | 7 | — | — | — | 25 |
| | | A6 MMA/iBMA = 95/5 | Part | — | — | — | 10 | — | — |
| | | A7 MMA/iBMA = 40/60 | Part | — | — | 10 | — | — | — |
| | | A8 MMA = 100 | Part | — | — | — | — | — | — |
| Physical properties of polyvinyl chloride molded body | Kinetic friction coefficient | JIS K 7125 | — | 0.493 | 0.724 | 0.670 | 0.697 | 1.256 | 0.486 |
| | Initial state | 10% tension stress | MPa | 8.5 | 6.7 | 8.7 | 7.1 | 7.6 | 10.6 |
| | | Rupture stress | MPa | 19.6 | 19.4 | 17.8 | 17.2 | 21.4 | 15.5 |
| | | Rupture elongation | % | 119 | 147 | 117 | 96 | 175 | 60 |
| | After heat aging | 10% tension stress | MPa | 13.2 | 10.7 | 10.7 | 10.0 | 10.8 | 14.3 |
| | | Rupture stress | MPa | 21.9 | 20.7 | 20.3 | 19.5 | 21.4 | 17.9 |
| | | Rupture elongation | % | 102 | 147 | 95 | 87 | 126 | 42 |
| | | Rate of change of 10% tension stress (after aging − initial state)/initial state | % | 55.3 | 59.7 | 23.0 | 40.8 | 42.1 | 34.9 |
| Powder characteristics | Blocking properties | Adhesive power | gf/cm² | <50 | <50 | >5000 | <50 | 240 | <50 |

| | | | | Comparative Example | | | | | |
|---|---|---|---|---|---|---|---|---|---|
| | | | | 3 | 4 | 5 | 6 | 7 | 8 |
| Formulation of polyvinyl chloride composition | Polyvinyl chloride (A) | KS-1700 | Part | 100 | 100 | 100 | 100 | — | 100 |
| | | S1004D | Part | — | — | — | — | 100 | — |
| | Plasticizer | | Part | 120 | 120 | 120 | 120 | 100 | 125 |
| | Acrylic modified polyorganosiloxane | | Part | 2 | 2 | 2 | 2 | 2 | 2 |
| | Polyvinyl chloride (B) | PSL-31 | Part | — | — | 20 | — | 10 | — |
| | | PSM-31 | Part | 17 | 20 | — | — | 5 | 10 |
| | Acrylic polymer | A1 MMA/iBMA = 60/40 | Part | 3 | — | — | — | 5 | — |
| | | A6 MMA/iBMA = 95/5 | Part | — | — | — | — | — | — |
| | | A7 MMA/iBMA = 40/60 | Part | — | — | — | — | — | — |
| | | A8 MMA = 100 | Part | — | — | — | 20 | — | 10 |
| Physical properties of polyvinyl chloride molded body | Kinetic friction coefficient | JIS K 7125 | — | 0.984 | 1.062 | 0.998 | 0.840 | 0.489 | 1.056 |
| | Initial state | 10% tension stress | MPa | 6.2 | 6.4 | 7.2 | 6.9 | 11.9 | 3.8 |
| | | Rupture stress | MPa | 18.9 | 20.1 | 20.0 | 19.1 | 21.1 | 13.3 |
| | | Rupture elongation | % | 155 | 158 | 155 | 145 | 83 | 165 |
| | After heat aging | 10% tension stress | MPa | 10.0 | 11.6 | 10.9 | 14.1 | 17.4 | 7.2 |
| | | Rupture stress | MPa | 21.5 | 21.8 | 21.1 | 19.0 | 23.1 | 18.6 |
| | | Rupture elongation | % | 124 | 118 | 112 | 58 | 77 | 165 |
| | | Rate of change of 10% tension stress (after aging − initial state)/initial state | % | 61.3 | 81.3 | 51.4 | 104.3 | 46.2 | 89.5 |
| Powder characteristics | Blocking properties | Adhesive power | gf/cm² | <50 | 110 | 210 | <50 | <50 | 450 |

TABLE 4

|  |  |  |  | Example | | | |
|---|---|---|---|---|---|---|---|
|  |  |  |  | 17 | 18 | 19 | 20 |
| Formulation of polyvinyl chloride composition | Polyvinyl chloride (A) (KS-1700) | | Part | 100 | 100 | 100 | 100 |
|  | Plasticizer | | Part | 120 | 120 | 120 | 120 |
|  | Acrylic modified polyorganosiloxane | | Part | 2 | 2 | 2 | 2 |
|  | Polyvinyl chloride (B) (PSM-31) | | Part | 10 | 10 | 10 | 10 |
|  | Acrylic polymer | A5 MMA/iBMA = 90/10 | Part | — | — | — | — |
|  |  | B1 MMA/nBMA/iBMA = 61/21.4/17.6 | Part | 10 | — | — | — |
|  |  | C1 MMA/iBMA = 60/40 | Part | — | 10 | — | — |
|  |  | C2 MMA/iBMA = 60/40 | Part | — | — | 10 | — |
|  |  | D1 MMA/nBMA = 60/40 | Part | — | — | — | 10 |
|  |  | E1 MMA/DMA = 90/10 | Part | — | — | — | — |
|  |  | E2 MMA/CHMA = 90/10 | Part | — | — | — | — |
|  |  | E3 MMA/BZMA = 90/10 | Part | — | — | — | — |
| Physical properties of polyvinyl chloride molded body | Kinetic friction coefficient | JIS K 7125 | — | 0.595 | 0.516 | 0.506 | 0.647 |
|  | Initial state | 10% tension stress | MPa | 6.8 | 8.8 | 8.5 | 6.5 |
|  |  | Rupture stress | MPa | 18.4 | 18.6 | 18.5 | 18.4 |
|  |  | Rupture elongation | % | 122 | 123 | 118 | 133 |
|  | After heat aging | 10% tension stress | MPa | 9.9 | 13.6 | 12.0 | 11.1 |
|  |  | Rupture stress | MPa | 18.9 | 21.3 | 20.3 | 20.2 |
|  |  | Rupture elongation | % | 90 | 94 | 103 | 91 |
|  | Rate of change of 10% tension stress (after aging - initial state)/initial state | | % | 45.6 | 54.5 | 41.2 | 70.8 |
| Powder characteristics | Blocking properties | Adhesive power | gf/cm$^2$ | 130 | <50 | <50 | 1850 |

|  |  |  |  | Example | | | |
|---|---|---|---|---|---|---|---|
|  |  |  |  | 21 | 22 | 23 | 24 |
| Formulation of polyvinyl chloride composition | Polyvinyl chloride (A) (KS-1700) | | Part | 100 | 100 | 10 | 100 |
|  | Plasticizer | | Part | 125 | 125 | 125 | 125 |
|  | Acrylic modified polyorganosiloxane | | Part | 2 | 2 | 2 | 2 |
|  | Polyvinyl chloride (B) (PSM-31) | | Part | 10 | 10 | 10 | 10 |
|  | Acrylic polymer | A5 MMA/iBMA = 90/10 | Part | 10 | — | — | — |
|  |  | B1 MMA/nBMA/iBMA = 61/21.4/17.6 | Part | — | — | — | — |
|  |  | C1 MMA/iBMA = 60/40 | Part | — | — | — | — |
|  |  | C2 MMA/iBMA = 60/40 | Part | — | — | — | — |
|  |  | D1 MMA/nBMA = 60/40 | Part | — | — | — | — |
|  |  | E1 MMA/DMA = 90/10 | Part | — | 10 | — | — |
|  |  | E2 MMA/CHMA = 90/10 | Part | — | — | 10 | — |
|  |  | E3 MMA/BZMA = 90/10 | Part | — | — | — | 10 |
| Physical properties of polyvinyl chloride molded body | Kinetic friction coefficient | JIS K 7125 | — | 0.560 | 0.713 | 0.594 | 0.746 |
|  | Initial state | 10% tension stress | MPa | 6.0 | 5.3 | 5.7 | 4.2 |
|  |  | Rupture stress | MPa | 13.8 | 15.5 | 14.9 | 16.6 |
|  |  | Rupture elongation | % | 126 | 178 | 147 | 193 |
|  | After heat aging | 10% tension stress | MPa | 8.3 | 9.1 | 8.4 | 7.0 |
|  |  | Rupture stress | MPa | 18.7 | 19.8 | 18.5 | 18.3 |
|  |  | Rupture elongation | % | 119 | 11.7 | 110 | 155 |
|  | Rate of change of 10% tension stress (after aging - initial state)/initial state | | % | 38.3 | 71.7 | 47.4 | 66.7 |
| Powder characteristics | Blocking properties | Adhesive power | gf/cm$^2$ | <50 | 440 | <50 | <50 |

As is clear from the results shown in Tables 2 to 4 above, the polyvinyl chloride molded bodies of Examples 1 to 24 had low kinetic friction coefficient, and thus the surface characteristics were favorable. In addition, they had low 10% tension stress, and thus their flexibility after heat aging was favorable. It was revealed from a comparison of Example 1 and Example 3 and a comparison of Example 2 and Example 6 that, in the cases where acrylic modified polyorganosiloxane was contained, the kinetic friction coefficient was smaller, and thus the surface characteristics were improved. It was revealed from a comparison between Examples 3 to 8 that the larger the blend amount of the acrylic polymer was, the smaller the kinetic friction coefficient was, and thus the surface characteristics were improved. It was revealed from a comparison between Examples 6, 9 to 12, 15, and 16 that, in the cases where the acrylic polymer contained at least one selected from the group consisting of n-butyl (meth)acrylate, isobutyl (meth)acrylate, and tert-butyl (meth)acrylate in an amount of 10 mass % or more and 50 mass % or less, the kinetic friction coefficient was smaller, and thus the surface characteristics were improved.

On the other hand, as is clear from the results shown in Table 3, in the cases of Comparative Examples 1, 4, and 5, which do not contain the acrylic polymer containing the constitutional unit derived from (meth)acrylic ester in an amount of 50 mass % or more, the kinetic friction coefficient exceeded 0.80, and thus the surface characteristics were poor. In the case of Comparative Example 3 in which the blend amount of the acrylic polymer containing the constitutional unit derived from at least one (meth)acrylic ester selected from the group consisting of a (meth)acrylic ester of an aliphatic alcohol having two or more carbon atoms and a (meth)acrylic ester of an aromatic alcohol in an amount of 50 mass % or more is less than 4 parts by mass, the kinetic friction coefficient exceeded 0.80, and thus the surface characteristics were poor. In the case where Comparative Example 2 in which the blend amount of the acrylic polymer exceeds 23 parts by mass, the 10% tension stress after heat aging exceeded 14.0 MPa, and thus the flexibility after heat aging was poor. In the cases of Comparative Examples 6 and 8 using the acrylic polymer containing no constitutional unit derived from at least one (meth)acrylic ester selected from the group consisting of a (meth)acrylic ester of an aliphatic alcohol having two or more carbon atoms and a (meth) acrylic ester of an aromatic alcohol, the kinetic friction coefficient exceeded 0.80, and thus the surface characteristics were poor. In the case of Comparative Example 7 in which the blend amount of the plasticizer was less than 110 parts by mass, the 10% tension stress after heat aging exceeded 14.0 MPa, and thus the flexibility after heat aging was poor.

The invention claimed is:

1. A polyvinyl chloride composition for powder molding comprising:
    a polyvinyl chloride (A) in an amount of 100 parts by mass;
    a plasticizer in an amount of 110 to 150 parts by mass; and
    an acrylic polymer in an amount of 4 to 23 parts by mass,
    wherein the polyvinyl chloride (A) has an average particle diameter of 50 μm to 500 μm and an average degree of polymerization of 1,350 or more,
    wherein the acrylic polymer has an average particle diameter of 0.01 μm to 10 μm and contains a constitutional unit derived from a (meth)acrylic ester in an amount of 50 mass % or more,
    wherein the (meth)acrylic ester includes at least one selected from the group consisting of a (meth)acrylic ester of an aliphatic alcohol having two or more carbon atoms and a (meth)acrylic ester of an aromatic alcohol, and
    wherein the acrylic polymer contains a constitutional unit derived from methyl (meth)acrylate in an amount of 40 to 60 mass %, and a constitutional unit derived from at least one (meth)acrylic ester selected from the group consisting of n-butyl (meth)acrylate, isobutyl (meth) acrylate, and tert-butyl (meth)acrylate in an amount of 40 to 60 mass %.

2. The polyvinyl chloride composition for powder molding according to claim 1,
    wherein the (meth)acrylic ester of an aliphatic alcohol having two or more carbon atoms includes at least one selected from the group consisting of n-butyl (meth) acrylate, isobutyl (meth)acrylate, and tert-butyl (meth) acrylate.

3. The polyvinyl chloride composition for powder molding according to claim 1, further comprising a polyvinyl chloride (B) having an average particle diameter of 0.05 μm or more and less than 50 μm,
    wherein the polyvinyl chloride composition contains the polyvinyl chloride (B) in an amount of 36 parts by mass or less with respect to 100 parts by mass of the polyvinyl chloride (A).

4. The polyvinyl chloride composition for powder molding according to claim 3,
    wherein the polyvinyl chloride composition contains the acrylic polymer and the polyvinyl chloride (B) in a total amount of 15 to 40 parts by mass with respect to 100 parts by mass of the polyvinyl chloride (A).

5. The polyvinyl chloride composition for powder molding according to claim 1, further comprising an acrylic modified polyorganosiloxane,
    wherein the polyvinyl chloride composition contains the acrylic modified polyorganosiloxane in a total amount of 5 parts by mass or less with respect to 100 parts by mass of the polyvinyl chloride (A).

6. The polyvinyl chloride composition for powder molding according to claim 1,
    wherein the plasticizer includes a trimellitate-based plasticizer.

7. The polyvinyl chloride composition for powder molding according to claim 1, wherein the polyvinyl chloride composition is used in powder slush molding.

8. The polyvinyl chloride composition for powder molding according to claim 1, wherein the (meth)acrylic ester of an aliphatic alcohol having two or more carbon atoms comprises at least one selected from the group consisting of n-butyl (meth)acrylate, isobutyl (meth)acrylate, tert-butyl (meth)acrylate, dodecyl (meth)acrylate, cyclohexyl (meth) acrylate, and benzyl (meth)acrylate.

9. A polyvinyl chloride molded body obtained by molding the polyvinyl chloride composition for powder molding according to claim 1 through powder slush molding.

10. A facing for a vehicle interior material, comprising the polyvinyl chloride molded body of claim 9.

11. A laminate obtained by laminating a polyurethane foam layer and the polyvinyl chloride molded body according to claim 9.

12. A vehicle interior material, comprising the laminate according to claim 11.

* * * * *